United States Patent
Richter

(10) Patent No.: US 6,584,941 B2
(45) Date of Patent: Jul. 1, 2003

(54) THERMOSTATIC VALVE

(75) Inventor: Wolfgang Richter, Kornwestheim (DE)

(73) Assignee: Behr Thermot-Tronik GmbH (DE)

( * ) Notice: Subject to any disclaimer, the term of this patent is extended or adjusted under 35 U.S.C. 154(b) by 0 days.

(21) Appl. No.: 09/969,414

(22) Filed: Oct. 2, 2001

(65) Prior Publication Data

US 2002/0043224 A1 Apr. 18, 2002

(30) Foreign Application Priority Data

Oct. 2, 2000 (DE) .......................... 100 48 792

(51) Int. Cl.⁷ .................................. F01P 7/14
(52) U.S. Cl. ................... 123/41.1; 236/101 C
(58) Field of Search ................ 123/41.1, 41.44; 236/34.5, 34, 99 R, 99 A, 99 C, 99 K, 101 R, 101 A, 101 C

(56) References Cited

U.S. PATENT DOCUMENTS 4,875,437 A * 10/1989 Cook et al. ................. 123/41.1
6,176,204 B1 * 1/2001 Heer ......................... 123/41.44

FOREIGN PATENT DOCUMENTS

| DE | 1 938 097 | 2/1971 |
|---|---|---|
| DE | 27 01 840 | 7/1977 |
| DE | 80 14 081 | 10/1981 |
| DE | 33 13 896 | 10/1984 |
| DE | 44 09 547 | 9/1999 |
| DE | 199 10 751 | 9/2000 |

* cited by examiner

Primary Examiner—Noah P. Kamen
(74) Attorney, Agent, or Firm—Kennedy Covington Lobdell & Hickman, LLP

(57) ABSTRACT

A thermostatic valve for an internal combustion engine cooling system comprises a valve housing, a temperature-sensitive operating element, and a closure member adjustably movable by the operating element. The valve housing comprises a radiator connection opening, an engine connection opening, and a auxiliary connection opening, and defines a radiator coolant flow path between the radiator connection opening and the auxiliary connection opening, a short circuit coolant flow path between the engine connection opening and the auxiliary connection opening. Each of the radiator and short circuit coolant flow paths pass around the operating element. The closure member is movable to a first position wherein the radiator connection opening is interrupted and the engine connection opening is opened and to a second position wherein the radiator connection opening is opened and the engine connection opening is interrupted.

13 Claims, 2 Drawing Sheets

6,584,941 B2

THERMOSTATIC VALVE

CROSS-REFERENCES TO RELATED APPLICATIONS

This application claims the benefit of German patent application DE P 100 48 792.0, filed Oct. 2, 2000, herein incorporated by reference.

BACKGROUND OF THE INVENTION

The present invention relates to a thermostatic valve, especially such a valve adapted for the cooling system of a vehicle with an internal-combustion engine. More particularly, the present invention relates to such a thermostatic valve having a valve housing, a temperature-sensitive operating element in an operating element housing affixed stationarily on the valve housing, and a closure member adjustably controlled by the operating element. The valve housing comprises a radiator connection opening, an engine connection opening and an additional auxiliary connection opening, whereby a radiator flow of the cooling system coolant can be established between the radiator connection opening and the auxiliary connection opening, a short circuit flow of the cooling system coolant can be established between the engine connection opening and the auxiliary connection opening, and the radiator flow and/or the short circuit flow can pass around the operating element.

German Patent Publication DE 44 09 547 C2 teaches a basic thermostatic valve. The thermostatic valve comprises an expansion element which actuates movement of two valve plates to open or close connection openings of the thermostatic valve. A radiator flow of the cooling system coolant starting from the radiator and a short circuit flow of the cooling system coolant from a short circuit line can pass around the expansion element. In intermediate positions of the valve the cooler radiator flow of the cooling system coolant and the warmer short circuit flow of the cooling system coolant can be mixed. When the radiator flow is blocked, whereby coolant from the engine passes only via the short circuit line to the thermostatic valve, a section of the expansion element lies in a cooler area of the coolant that is in direct fluid communication with the radiator. The expansion element can be electrically heated in order to influence the regulating curve of the thermostatic valve. Relatively large positioning forces are necessary in order to close the valve plates against a coolant flow through the thermostatic valve.

SUMMARY OF THE INVENTION

It is accordingly an object of the present invention to solve the technical problem of improving the control dynamics of a thermostatic valve.

The present invention provides to this end a thermostatic valve, especially for the cooling system of a vehicle with an internal-combustion engine, comprising a valve housing, a temperature-sensitive operating element in an operating element housing affixed stationarily on the valve housing, and a closure member that can be adjustably controlled by the operating element. The valve housing comprises a radiator connection opening, an engine connection opening and an additional auxiliary connection opening, whereby a radiator flow of the cooling system coolant can be established between the radiator connection opening and the auxiliary connection opening, a short circuit flow of the cooling system coolant can be established between the engine connection opening and the auxiliary connection opening, and the radiator flow and/or the short circuit flow can pass around the operating element.

According to the present invention, a fluid connection between the radiator connection opening and the operating element is interrupted and the engine connection opening is opened in a first position of the closure member, and in a second position of the closure member, the radiator connection opening is opened and a fluid connection between the engine connection opening and the operating element is interrupted. As a result of this arrangement, only the short circuit flow of the cooling system coolant passes around the operating element in its first position since the radiator flow of the cooling system coolant is already blocked upstream from the operating element and, in the case of a reverse flowthrough, upstream from the radiator. Accordingly, there is no fluid connection between the operating element and the vehicle radiator in the first position. Thus, in the first position of the closure member, a rapid heating of the operating element by the warmer short circuit coolant flow is achieved. As a consequence, after sufficient heating of the coolant of the short circuit coolant flow in the short circuit circulatory system, the cooler radiator flow of the cooling system coolant from the cooling circuit is rapidly mixed in, resulting in a control dynamics of the thermostatic valve that is improved over the state of the art. Only the radiator coolant flow passes around the operating element in its second position because the engine connection opening is closed upstream from the operating element and, given the reverse flowthrough, upstream from the engine, and there is no fluid connection between the engine block and the operating element. This results in lesser disturbing influences in the regulating of the coolant circuit as a function of the coolant temperature of the cooler radiator coolant flow. For example, an expansion element can be provided as temperature-sensitive operating element, that can also be combined with an actuating drive.

According to a further development of the present invention, a section of the operating element, around which the warmer short circuit coolant flow can not flow in the first position, comprises a thermal insulation. As a result, the operating element can be better insulated against cooler areas into which sections of the operating element can extend. The heating of the operating element by the warmer short circuit coolant flow can take place even more rapidly by such an insulation.

A further feature of the invention provides that the closure member is designed as a closure ring in the preferred form of an annular slide valve. The provision of a closure ring makes possible a slight pressure drop in the first and second positions as well as in all intermediate positions of the closure member in the thermostatic valve. Relatively lower adjusting forces are sufficient in order to shift the closure ring, in comparison to a plate valve. Even in the case of a rapid opening of the closure ring its tendency to oscillate is low.

A further aspect of the invention is that the closure ring provides for an inner coolant flow. Such an inner coolant flow can be used advantageously for a heating circuit, resulting in a compact arrangement of the thermostatic valve. For reasons of comfort, a heating circuit is not closed even when the engine is cooler, so that the provision of a closure ring with inner coolant flow that does not have to be closed represents a compact and simple arrangement.

A further feature of the invention is that an annular sealing surface is provided on the valve housing on which surface a front side of the closure ring rests in one of the positions. The annular sealing surface and the front side of the closure ring are beveled relative to a longitudinal axis of the closure ring and generally extend parallel to one another. Substantially parallel, oblique sealing surfaces make possible a gentle opening of the closure ring, which avoids pressure jolts. The oblique sealing surfaces, that are parallel to one another, advantageously extend parallel to the direction of coolant flow. The beveled front side of the closure ring can be realized in a simple manner by means of an obliquely extending bend or offset of the closure ring.

In a further development of the invention, the closure ring comprises an annular baffle extending from the front side of the closure ring. The coolant flow in the thermostatic valve can be guided with such a baffle, as a result of which a low pressure drop can be achieved and the occurrence of oscillations and pressure spikes is avoided.

A thermal insulation is advantageously provided in the area at which the operating element is fastened to the valve housing. As a result, the valve-housing temperature exerts only a slight influence on the operating element and the position of the closure ring and accordingly the valve housing can be manufactured from a heat conductive material, e.g., from aluminum. Such a thermal insulation also insulates against coolant areas in the particular end positions of the closure ring.

A further feature of the invention provides that the operating element can be heated by an energy source other than the circulating engine coolant. This makes it possible to influence the regulating curve of the operating element. For example, an electrically heatable expansion element can be provided that can also be realized in combination with an actuating drive.

In a further development of the invention, the closure member comprises a guide bolt shiftably guided in the valve housing. A guiding of the closure member is achieved therewith both by the operating element and also by the guide bolt. This results in a good guidance of the closure member that is advantageous especially on account of the customarily strong pre-tensioning of the closure member by pressure springs. In turn, a fluttering or clamping of the closure member is avoided. In particular, a two-sided guidance of a closure ring is advantageous since the closure ring is guided on the one side by the operating element and on the other side by the guide bolt.

A further measure of the invention provides a sensor for detecting the position of the closure member. As a result, the position of the closure member can be detected and transmitted further to a control device or diagnostic device. The regulating curves of the thermostatic valve can be influenced in a purposeful manner in combination with a control device and a heatable operating element or an actuating drive.

The housing is advantageously a component of a coolant pump housing. As a result of this measure, no additional housing is required for a thermostatic valve.

In a further development of the invention, the radiator coolant flow can be established from the radiator connection opening to the auxiliary connection opening or in the reverse direction, and the short circuit coolant flow can be established from the engine connection opening to the auxiliary connection opening and in the reverse direction. The thermostatic valve of the invention can be used therewith for inlet-regulated cooling systems as well as for outlet-regulated cooling systems.

Further features and advantages of the invention will be understood from the following description of preferred embodiments of the present invention in conjunction with the drawings and the accompanying claims.

DETAILED DESCRIPTION OF THE PREFERRED EMBODIMENTS

Figure 1:
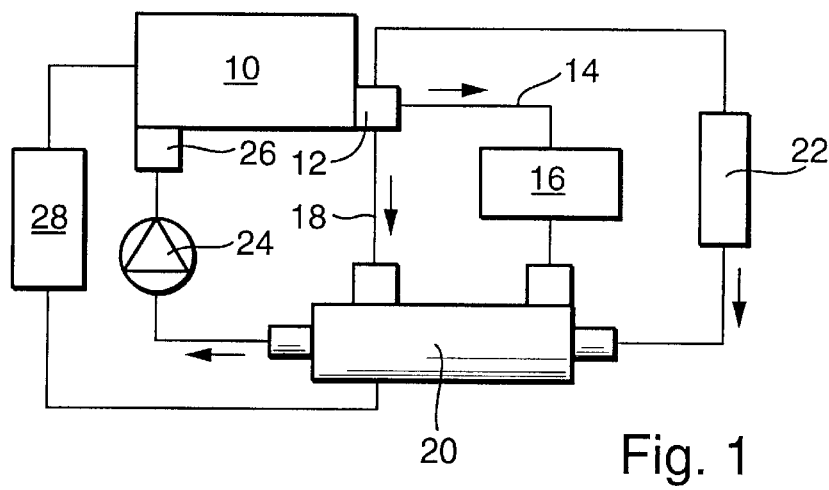
FIG. 1 is a schematic view of a cooling system of a vehicle with an internal combustion engine having a thermostatic valve in accordance with a first embodiment of the present invention.

Referring now to the accompanying drawings and initially to FIG. 1, a cooling system for a vehicle with an internal combustion engine 10 is schematically shown. A so-called inlet-regulated cooling system is shown. Heated coolant leaving internal combustion engine 10 at connection 12 is conveyed via radiator line 14 to vehicle radiator 16. The connection 12 also communicates with a radiator by-pass line, also known as a short circuit line 18, via which heated coolant can pass directly to thermostatic valve 20, circumventing vehicle radiator 16. The connection 12 also delivers heated coolant to additional devices or accessories such as a vehicle heating system 22. Thus, the coolant simultaneously flows via the connection 12 to thermostatic valve 20 via short circuit line 18, vehicle radiator 16 and vehicle heating 22. The coolant temperature of internal combustion engine 10 is brought about in thermostatic valve 20 by mixing the coolant flows from a short-circuited line, namely, from short circuit line 18, and from a radiator circuit, namely, via radiator 16. The mixing takes place by opening and closing connection openings for the short-circuited circuit and the radiator circuit by corresponding, different positions of a closure member in the interior of thermostatic valve 20. Thermostatic valve 20 is located thereby on the suction side of coolant pump 24, whose pressure side is associated with connection opening 26 of engine 10. The direction of flow of the coolant in the particular circuits is indicated by the arrows in FIG. 1.

In addition, the cooling system of FIG. 1 is provided with control device 28 that exchanges data with internal combustion engine 10 and thermostatic valve 20, e.g., a coolant temperature in the engine as well as a position of the closure member in thermostatic valve 20. An activation of an actuating drive or of an additional heating of thermostatic valve 20 is also possible via control device 28.

Figure 2:
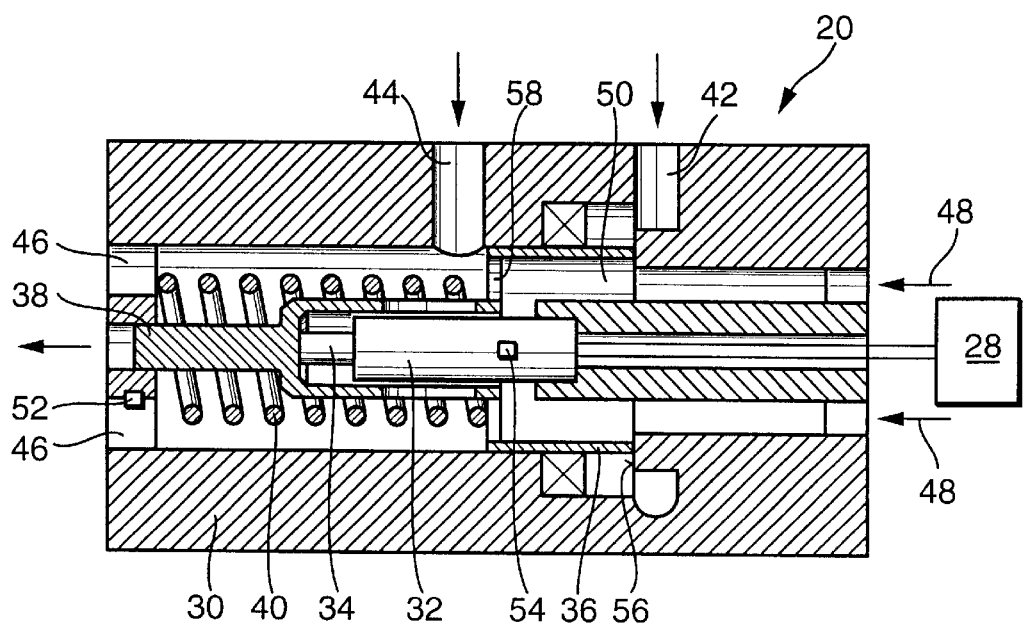
FIG. 2 is a sectional view of the thermostatic valve of FIG. 1.

FIG. 2 shows a sectional view of thermostatic valve 20. Expansion element 32 is arranged in valve housing 30 as a temperature-sensitive operating element. Expansion element 32 comprises piston 32 to which closure ring 36 is fastened. Closure ring 36 is provided in a front area with guide bolt 38 that is shiftably guided in valve housing 30. Closure ring 36 is shown in the view of FIG. 2 in a first end position into which it is biased by the tensioning force of pressure spring 40.

Valve housing 30 is provided with radiator connection opening 42, e.g., for communication with the radiator coolant flow from the radiator 16, engine connection opening 44, e.g., for communication with the short-circuit coolant flow from the engine 10, an auxiliary connection opening 46 and additional connection openings 48 for additional devices, e.g., a heating circuit. In the case of the cooling system of FIG. 1, coolant passes via radiator connection opening 42, engine connection opening 44 and/or connection openings 48 into mixing chamber 50 of thermostatic valve 20 and leaves thermostatic valve 20 via auxiliary connection opening 46. In the case of the cooling system of FIG. 4, the coolant flow would pass reversely through thermostatic valve 20 in the opposite direction.

The position of closure ring 36 is detected by path sensor 52 in housing 30 and transmitted to control device 28. Operating element 32 is provided with heating element 54 controlled by control device 28.

A cooler radiator coolant flow is defined in thermostatic valve 20 between radiator connection opening 42 and auxiliary connection opening 46 and a warmer short circuit coolant flow is defined between engine connection opening 44 and auxiliary connection opening 46. Both the cooler radiator coolant flow and the warmer short circuit coolant flow can flow around the operating element in the particular position of closure ring 36. The cooler radiator coolant flow and the warmer short circuit coolant flow are mixed in mixing chamber 50 in accordance with the position of closure ring 36. Coolant can flow at all times through thermostatic valve 20 from connection openings 48 to exit connection opening 46 since closure ring 36 comprises openings 58 that form an inner coolant flow of closure ring 36 that can not be closed.

As long as during the warmer running phase of the internal combustion engine the coolant temperature is below the temperature at which expansion element 32 begins to shift piston 32, closure ring 36 remains in the first position shown in FIG. 2. In this first position, annular front side 56 of the closure ring is pressed by pressure spring 40 against a sealing surface, also annular, on housing 30. This closes radiator connection opening 42 and the coolant flows exclusively through the short-circuited line into engine connection opening 44. Since radiator connection opening 42 is closed, as viewed in the direction of the cooler water coolant flow, upstream from expansion element 32, then the expansion element 32 is directly contacted by the warmer coolant flow arriving from engine connection opening 44, whereby expansion element 32 is rapidly heated upon a corresponding temperature rise of the coolant. This achieves large dynamics in the operating movements of thermostatic valve 20 in regard to an opening of radiator connection opening 42 and of the radiator circuit.

If the temperature of the coolant is above the temperature at which expansion element 32 opens radiator connection opening 42, thermostatic valve 20 then shifts into a control phase. When the expansion element 32 is heated beyond this opening temperature, then expansion element 32 shifts piston 34 and therewith closure ring 36, and opens radiator connection opening 42 while engine connection opening 44 is partially closed at the same time. The coolant then flows through the radiator circuit and radiator connection opening 42 as well as through engine connection opening 44 and the short-circuited line. The cooler coolant flow exiting from radiator connection opening 42 and the warmer coolant flow exiting from engine connection opening 44 are mixed in mixing chamber 50. Coolant with a mixing temperature from all coolant flows, including also the coolant flow exiting connection openings 48, is always supplied therewith to the engine in the control phase. An over-adjustment of the thermostatic control and the supplying of cooler coolant to the engine is prevented by this control phase.

In the warmer state of engine operation, i.e., when the coolant reaches a normal operating temperature, expansion element 36 shifts piston 34 and therewith closure ring 36 sufficiently that engine connection opening 44 of the short-circuited line is completely closed and the coolant passes only through radiator connection opening 42 into mixing chamber 50. If closure ring 36 has completely closed engine connection opening 44, a second position of closure ring 36 is achieved in this manner in which position engine connection opening 44, viewed in the direction of the warmer coolant flow, is closed upstream from expansion element 32. Even in the case of a further elevation of temperature of the coolant up to the maximum admissible temperature, closure ring 36 is shifted further in the direction of the opening of the radiator circuit while engine connection opening 44, however, remains closed. Thus, only the cooler coolant flow exiting from the radiator line flows around expansion element 32 when the coolant temperature is between the operating temperature and the maximum permissible temperature. The expansion element thus reacts rapidly to a cooling of the coolant of the radiator conduit, resulting in a large control dynamics regarding the closing of the cooling circuit and of radiator connection opening 42.

Heating element 54 in expansion element 32 can be regulated during the control phase as well as at the operating temperature under defined or special engine loads, as a consequence of which additional energy is supplied to the expansion material of the expansion element 32 to achieve an additional stroke of piston 34. As a result, radiator connection opening 42 of the radiator circuit is opened further and enlarged in order to protect the engine from overheating of the coolant flow.

Figure 3:
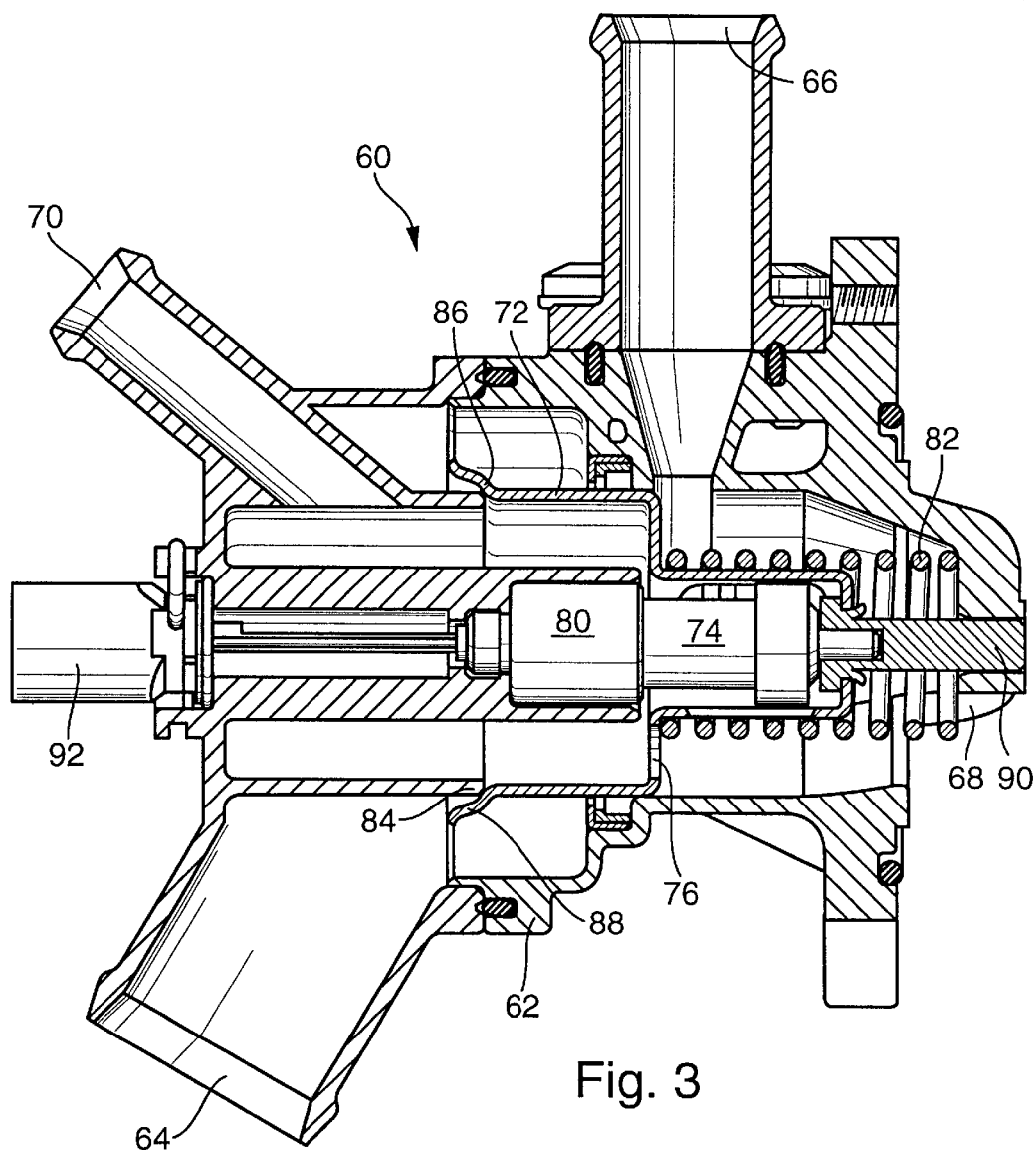
FIG. 3 is a sectional view of a further, preferred embodiment of the thermostatic valve of the present invention.

FIG. 3 shows another embodiment of a thermostatic valve 60 in accordance with the invention. Thermostatic valve 60 comprises multipartite valve housing 62 in which a radiator connection opening 64, an engine connection opening 66, an auxiliary connection opening 68 and an additional connection opening 70 for a heating circuit are provided. Radiator connection opening 64 and engine connection opening 66 can be opened and closed by shifting movements of closure ring 72 inside thermostatic valve 60 by expansion element 74. A housing of expansion element 74 is held stationarily on valve housing 62. Connection opening 70 for the heating circuit can not be closed by closure ring 72 but rather a flow of coolant is possible from connection opening 70 through inner flow conduit 76 provided in closure ring 72 to auxiliary connection opening 68 in all positions of closure ring 72.

A section of expansion element 74 which section is fastened to valve housing 62 is provided with thermal insulation 80. Expansion element 74 is insulated by this thermal insulation 80 on the one hand against valve housing 62 and on the other hand in the first position shown in FIG. 3 against a coolant flow of the heating circuit from connection opening 70. This reduces disturbing influences so that expansion element 74 is influenced practically exclusively by the warmer coolant flow exiting from engine connection opening 66. Even in the case of a completely or partially open radiator connection opening 64, the influence of the temperature of valve housing 62 on the temperature of expansion element 74, and therewith the position of closure ring 72, is diminished by thermal insulation 80.

In the first position shown in FIG. 3, a front side of closure ring 72 is urged by pressure spring 82 against annular sealing surface 84 on valve housing 62. The front side of closure ring 72 formed by annular bend 86 and annular sealing surface 84 generally extend parallel to one another and are beveled relative to a longitudinal axis of thermostatic valve 60. The beveling of sealing surface 84 and of bend 86 extends substantially parallel to the cooler coolant flow in the area of bend 86. In addition to the beveling of sealing surface 84 and of bend 86, annular baffle 88 also contributes to a gentle opening of closure ring 72 and to avoiding pressure losses. Annular baffle 88 is designed in one piece with closure ring 72 and extends starting from annular bend 86 of closure ring 72, by means of which bend the beveling of the front side of closure ring 72 is brought about.

As has already been explained with respect to the thermostatic valve shown in FIG. 2, closure ring 72 is guided on two sides, namely, on the one side by expansion element 74 and on the other side by guide bolt 90 supported in such a manner that it can be shifted in a sliding manner in a corresponding bore of valve housing 62. This achieves an exact guidance of closure ring 72 and prevents clamping up of the closure ring 72.

Expansion element 74 is provided with an electric heating element, e.g., an electrical heating resistor, to which electrical energy can be supplied via connection 92. The regulating curve of thermostatic valve 60 can be shifted by the heating element, as was explained in conjunction with FIG. 2.

Figure 4:
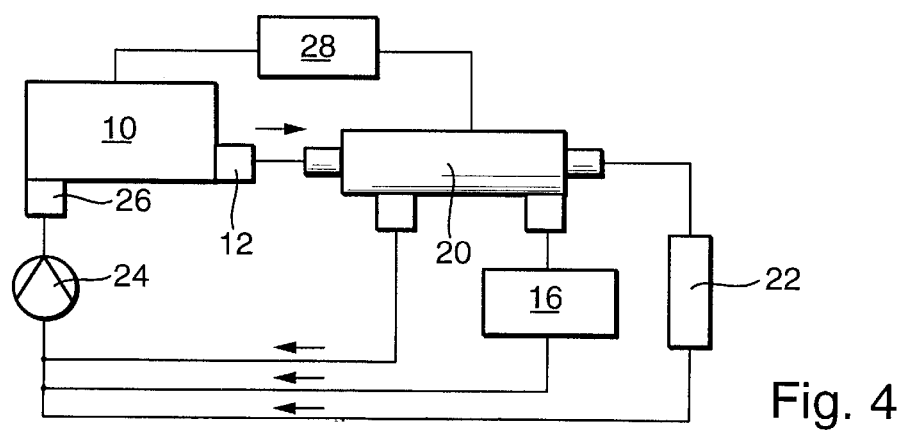
FIG. 4 is a schematic view of another cooling system of a vehicle with a thermostatic valve in accordance with the present invention.

The view in FIG. 4 schematically shows a further cooling system for a vehicle with internal combustion engine 10. Components that are the same as in the cooling system of FIG. 1 are shown with the same reference numerals. The cooling system in this embodiment is an outlet-regulated system in that the coolant flow moves in the reverse direction compared to the inlet-regulated cooling system of FIG. 1. Heated coolant leaves internal combustion engine 10 at connection 12 and passes directly to thermostatic valve 20. The coolant flow from internal combustion engine 10 is divided into different partial coolant flow paths in thermostatic valve 20. A first partial coolant flow passes via a short circuit line 18 directly to coolant pump 24 and therefrom to inlet opening 26 of engine 10. A second partial coolant flow is directed through radiator 16 and then to coolant pump 24 and from there to internal combustion engine 10. A third partial coolant flow branches off from thermostatic valve 20 to vehicle heating 22 and passes from there to coolant pump 24 and to engine 10. As in the cooling system of FIG. 1, control device 28 detects a coolant temperature in engine 10 and activates an actuating drive and/or an additional heating of thermostatic valve 20.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A thermostatic valve adapted for a cooling system of a vehicle with an internal-combustion engine and a radiator, comprising
   a valve housing,
   a temperature-sensitive operating element in an operating element housing affixed stationarily on the valve housing, and
   a closure member adjustably movable by the operating element,
   the valve housing comprising a radiator connection opening for connection to the radiator, an engine connection opening for connection to the engine, and a auxiliary connection opening, and defining a radiator coolant flow path between the radiator connection opening and the auxiliary connection opening, a short circuit coolant flow path between the engine connection opening and the auxiliary connection opening, each of the radiator coolant flow path and the short circuit coolant flow path passing around the operating element,
   the closure member being movable to a first position wherein the radiator coolant flow path is interrupted to prevent fluid communication from the radiator connection opening to the operating element and the engine connection opening is opened to the short circuit coolant flow path and to a second position wherein the radiator connection opening is opened to the radiator coolant flow path and the short-circuit flow path is interrupted to prevent fluid connection between the engine connection opening and the operating element.

2. The thermostatic valve according to claim 1, characterized in that a section of the operating element comprises a thermal insulation around which section the coolant flow is prevented in the first position.

3. The thermostatic valve according to claim 1, characterized in that the closure member comprises a closure ring.

4. The thermostatic valve according to claim 3, characterized in that the closure ring defines an inner coolant flow path.

5. The thermostatic valve according to claim 3, characterized in that the valve housing comprises an annular sealing surface for engagement with a front side of the closure ring in an end position, the annular sealing surface and the front side of the closure ring being beveled relative to a longitudinal axis of the closure ring in generally parallel relation to one another.

6. The thermostatic valve according to claim 5, characterized in that the closure ring comprises an annular baffle extending from the front side.

7. The thermostatic valve according to claim 1, characterized in that a thermal insulation is provided in a fastening area of the operating element between the valve housing and the operating element.

8. The thermostatic valve according to claim 1, characterized in that the operating element is adapted to be heated by an external energy source.

9. The thermostatic valve according to claim 1, characterized in that the closure member comprises a guide bolt shiftably guided in the valve housing.

10. The thermostatic valve according to claim 1, characterized further by a sensor for detecting the position of the closure member.

11. The thermostatic valve according to claim 1, characterized in that the housing is a component of a coolant pump housing.

12. The thermostatic valve according to claim 1, further comprising:

means for controlling the radiator coolant flow path from the radiator connection opening to the auxiliary connection opening; and means for controlling the short circuit coolant flaw path from the engine connection opening to the auxiliary connection opening.

13. The thermostatic valve according to claim 1, further comprising:

means for controlling the radiator coolant flow path from the auxiliary connection opening to the radiator connection opening; and means for controlling the short circuit coolant flow path from the auxiliary connection opening to the engine connection opening.

* * * * *